(12) United States Patent
Mizuta et al.

(10) Patent No.: US 8,461,518 B2
(45) Date of Patent: Jun. 11, 2013

(54) METHOD OF COLLECTING CALIBRATION DATA IN RADIATION TOMOGRAPHY APPARATUS

(75) Inventors: Tetsuro Mizuta, Kyoto (JP); Yoshihiro Inoue, Kyoto (JP); Masaharu Amano, Ibaraki (JP); Kazumi Tanaka, Otsu (JP); Atsushi Ohtani, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 13/145,786

(22) PCT Filed: Jan. 23, 2009

(86) PCT No.: PCT/JP2009/000251
§ 371 (c)(1),
(2), (4) Date: Jul. 21, 2011

(87) PCT Pub. No.: WO2010/084528
PCT Pub. Date: Jul. 29, 2010

(65) Prior Publication Data
US 2011/0278443 A1 Nov. 17, 2011

(51) Int. Cl.
*G01D 18/00* (2006.01)
(52) U.S. Cl.
USPC .................................................. 250/252.1
(58) Field of Classification Search
USPC .................................................. 250/252.1
See application file for complete search history.

(56) References Cited

U.S. PATENT DOCUMENTS

| 6,629,469 | B2 | 10/2003 | Jaszczak et al. |
| 7,569,829 | B2 * | 8/2009 | Chen et al. ............... 250/363.09 |
| 2009/0190723 | A1 * | 7/2009 | Jang et al. .................... 378/207 |
| 2010/0316275 | A1 * | 12/2010 | Stolin et al. ................... 382/131 |

FOREIGN PATENT DOCUMENTS

| JP | 2-262086 A | 10/1990 |
| JP | 10-2965 A | 1/1998 |
| JP | 2001-208849 A | 8/2001 |
| JP | 2003-536107 A | 12/2003 |

OTHER PUBLICATIONS

International Search Report for the Application No. PCT/JP2009/000251 mailed Mar. 17, 2009.

* cited by examiner

*Primary Examiner* — Marcus Taningco
(74) *Attorney, Agent, or Firm* — Cheng Law Group, PLLC (57) ABSTRACT

This invention has one object to provide a method of collecting calibration data in radiation tomography apparatus that allows reliable collection of calibration data with a wide detector ring. In order to achieve this purpose, in the method of collecting calibration data in radiation tomography apparatus according to this invention, the number of coincidence events is obtained while the phantom that emits annihilation gamma-ray pairs moves as to pass through an inner hole of the detector ring. Such configuration dose not need the phantom having a width equal or larger than the detector ring, and may realize reliable collection of calibration data. Moreover, it may be considered that annihilation gamma-ray pairs have been emitted in uniform property without depending on positions of the detector ring. As a result, calibration data that is more suitable for removal of a image artifact may be obtained.

11 Claims, 9 Drawing Sheets

METHOD OF COLLECTING CALIBRATION DATA IN RADIATION TOMOGRAPHY APPARATUS

TECHNICAL FIELD

This invention relates to a method of collecting calibration data in radiation tomography apparatus that images radiation. Particularly, this invention relates to a method of collecting calibration data in radiation tomography apparatus having block radiation detectors arranged in a ring shape.

BACKGROUND ART

In medical fields, radiation emission computed tomography (ECT: Emission Computed Tomography) apparatus is used that detects an annihilation radiation (for example, gamma rays) pair emitted from radiopharmaceutical that is administered to a subject and is localized to a site of interest for obtaining sectional images of the site of interest in the subject showing radiopharmaceutical distributions. Typical ECT equipment includes, for example, a PET (Positron Emission Tomography) device and an SPECT (Single Photon Emission Computed Tomography) device.

A PET device will be described by way of example. The PET device has a detector ring with block radiation detectors arranged in a ring shape. The detector ring is provided for surrounding a subject, and allows detection of radiation that is transmitted through the subject.

Figure 10:
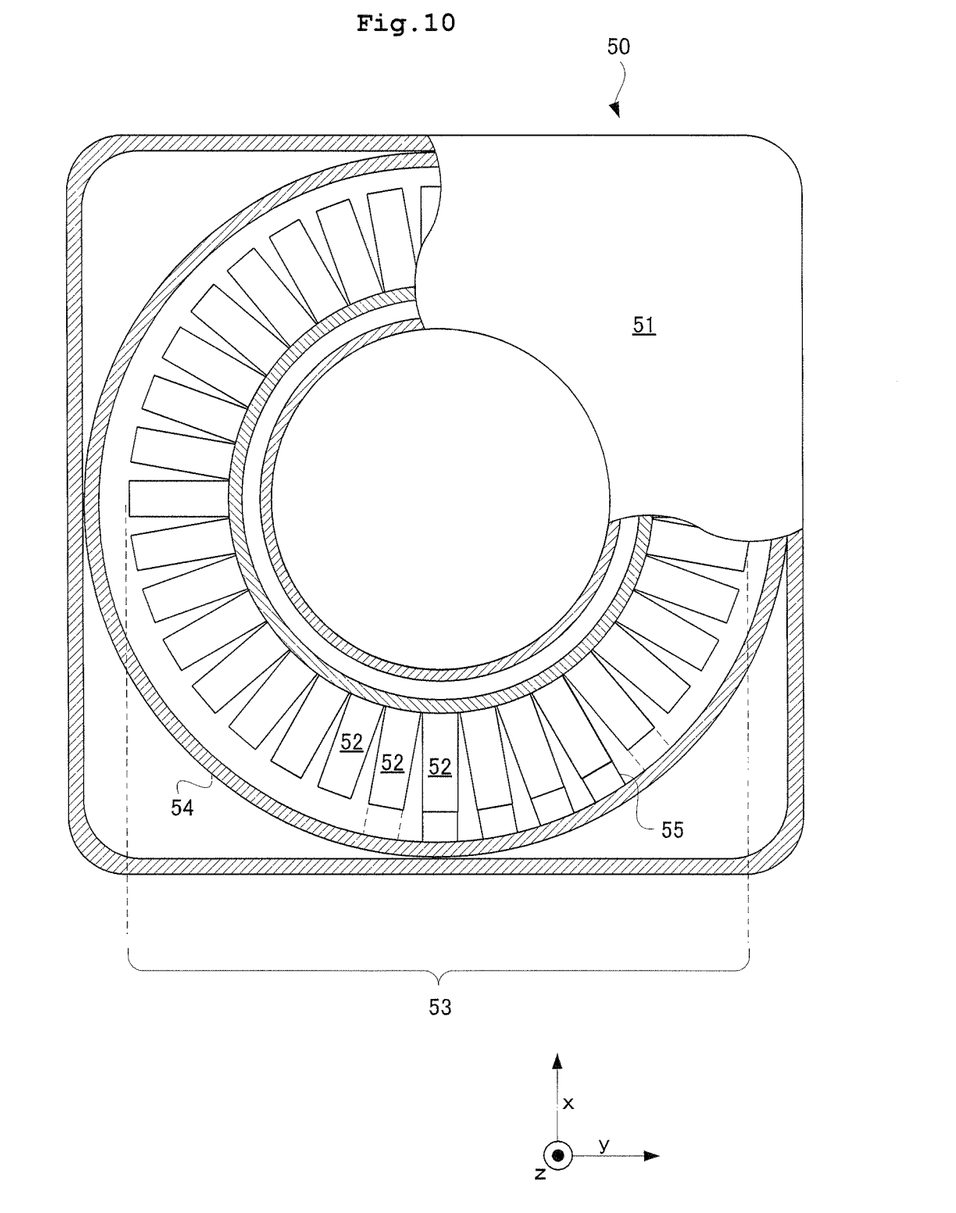
FIG. 10 is a sectional cut-away view showing a configuration of the conventional radiation tomography apparatus.

Such radiation detector arranged in the detector ring of the PET device is often equipped that allows position discrimination in a depth direction of a scintillator provided in the radiation detector for enhanced resolution. First, description will be given of a configuration of a conventional PET device. As shown in FIG. 10, a conventional PET device 50 includes a gantry 51 with an introducing hole that introduces a subject, a detector ring 53 having block radiation detectors 52 for detecting radiation being arranged inside the gantry 51 as to surround the introducing hole, and a support member 54 provided as to surround the detector ring 53. Each of the radiation detectors 52 has a bleeder unit 55 with a bleeder circuit in a position between the support member 54 and thereof for connecting the support member 54 and the radiation detector 52.

The PET device determines annihilation radiation pairs emitted from radiopharmaceutical. Specifically, an annihilation radiation pair emitted from inside of a subject M is a radiation pair having traveling directions opposite by 180 degrees.

In order to use such PET device 50, variation in sensitivity is firstly obtained that is used for image correction. Specifically, a cylindrical phantom as a generating source of annihilation radiation pairs is inserted into the gantry 51, and the detector ring 53 detects annihilation radiation pairs (see, for example, Patent Documents 1.) Here, although annihilation radiation pairs are uniformly emitted from the entire phantom, the detector ring 53 does not necessarily output a result that annihilation radiation pairs are uniformly emitted from the entire phantom. That is because detection sensitivity of radiation varies in each radiation detecting element that forms the detector ring 53. Accordingly, some image artifact may fall in an image having imaged distribution of annihilation radiation pairs inside the gantry 51, which corresponds to variation in detection sensitivity of annihilation radiation pairs that the detector ring 53 uniquely has.

The image artifact is superimposed also on a radiological image with a subject image falling therein. Image processing that cancels the image artifact is performed to the radiological image, whereby variation in sensitivity falling in the radiological image is cancelled. Accordingly, a clear radiological image with only the subject image falling therein may be obtained. That is, the phantom as a radiation source is inserted in advance to the detector ring 53 prior to performance of tomography of the subject for determination of variation in detection sensitivity.

[Patent Literature 1] Japanese Patent Publication No. H10-2965

DISCLOSURE OF THE INVENTION

Summary of the Invention

The conventional construction, however, has the following problem. Specifically, the problem is that the conventional construction has difficulty in controlling the phantom to be inserted into the detector ring 53 having a large width. Recently, radiation tomography apparatus has been developed having the wide detector ring 53 as to cover the entire of the subject. In order to cancel variation in sensitivity that such radiation tomography apparatus uniquely has, a long and huge phantom is needed sufficient to fill a through hole of the detector ring 53.

Pre-arrangement is performed to the phantom prior to insertion into the detector ring 53. Specifically, the phantom is a solution-filled receptacle, and the inside thereof is firstly filled with a solution. Subsequently, a radioactive material is added to agitate the solution. The wider detector ring 53 needs an increased amount of the solution for filling the phantom, which leads to difficulty in agitating the solution. Moreover, it is also complicated to insert the phantom subjected to the pre-arrangement into the detector ring 53.

This invention has been made regarding the state of the art noted above, and its object is to provide a method of collecting calibration data in radiographic apparatus that allows collection of the calibration data reliably with a wider detector ring 53.

Means for Solving the Problem

This invention is configured as stated below to achieve the above object. A method of collecting calibration data in radiation tomography apparatus according to this invention is provided having unit detecting rings with radiation detecting elements arranged annularly for detecting radiation, a coincidence device for counting a number of coincidence events as a number of times that two different radiation detecting elements detect radiation coincidentally, and a calibration data generation device for generating calibration data based on the number of coincidence events, further having a detector ring with the unit detector rings laminated such that central axes thereof conform to one another, in which the number of coincidence events is obtained while a phantom emitting annihilation radiation pairs moves within an inner hole of the detector ring; wherein a direction where the detector ring extends is an extension direction, the phantom moves relative to the detector ring along the extension direction, and the phantom has a length in the extension direction that is shorter than detector ring, in the extension direction.

[Operation and Effect]

According to this invention, the number of coincidence events is obtained while the phantom that emits annihilation radiation pairs moves as to pass through the inner hole of the detector ring. Such configuration dose not need the phantom having a width equal or larger than that of the detector ring, and may realize reliable collection of calibration data. Moreover, the phantom presents a shape that emits annihilation radiation pairs uniformly to the detector ring. However, actual annihilation radiation pairs somewhat differ in irradiation property depending on positions of the phantom. In the conventional configuration in which the phantom does not move in the detector ring, annihilation radiation pairs to be emitted differ in irradiation property depending on positions of the phantom. Accordingly, variation in irradiation of the phantom with annihilation radiation pairs will be superimposed on the calibration data. On the other hand, according to this invention, the phantom moves into the detector ring. Consequently, variation in irradiation of annihilation radiation pairs in the phantom becomes blurred in the calibration data. Moreover, it may be considered that annihilation radiation pairs have been emitted in uniform property without depending on positions of the detector ring. As a result, calibration data more suitable for removal of the image artifact may be obtained.

As in this configuration, the method of collecting calibration data according to this invention is applicable to the case where the detector ring extends over the phantom in the extension direction.

Moreover, the phantom mentioned above is preferably moved with a phantom moving device that moves the phantom and a phantom control device that controls the phantom moving device.

[Operation and Effect]

The above configuration represents a specific aspect in movement of the phantom. That is, this configuration includes each device for moving the phantom. Accordingly, the phantom may be moved more faithfully.

Moreover, the foregoing phantom preferably reciprocates relative to the detector ring.

[Operation and Effect]

According to this configuration, the phantom may be placed in the detector ring for a sufficiently long time, which results in increase in number of coincidence events adopted for obtaining calibration data. Moreover, the phantom moves complicatedly. Accordingly, variation in radiation of the phantom with annihilation radiation pairs becomes more blurred in the detector ring. Consequently, calibration data may be obtained that is more suitable for removal of the image artifact. The annihilation radiation pair contained in the phantom is strongest when the phantom is set into the detector ring, and is attenuated gradually. According to this configuration, the phantom reciprocates in the detector ring. Accordingly, it may be considered that annihilation radiation pairs have been emitted in the detector ring in uniform property.

Moreover, it is more preferable that the speed of the foregoing phantom is the fastest at the time of starting movement, and gradually slows as the phantom moves.

[Operation and Effect]

According to this configuration, it may be considered that annihilation radiation pairs have been emitted in the detector ring in uniform property. The annihilation radiation pair contained in the phantom is strongest when the phantom is set into the detector ring, and is attenuated gradually. Consequently, the dose of annihilation radiation pairs per unit time to be emitted in the detector ring differs between a movement starting position and a movement termination position of the phantom. With this configuration, control of the speed of the phantom may realize decrease in dose of annihilation radiation pairs to be emitted in the detector ring in the movement starting position of the phantom, whereas may realize increase in dose of annihilation radiation pairs to be emitted in the detector ring in the movement termination position of the phantom.

Moreover, the foregoing coincidence device counts the number of coincidence events only when a distance between two radiation detecting elements in the extension direction is equal or less than a given length. The phantom has a length in the extension direction that is longer than the given length. Such configuration is preferable.

[Operation and Effect]

With this configuration, data processing on the number of coincidence events may significantly be reduced. Specifically, the coincidence device counts the number of coincidence events only when a distance between two radiation detecting elements in the extension direction is equal or less than a given length. Where two radiation detecting elements are far apart from each other in the extension direction, the number of coincidence events is not counted between such radiation detecting elements. That is because a burden of the coincidence device may increase. Moreover, the phantom has a length in the extension direction that is longer than the given length. In other words, annihilation radiation pairs may be emitted reliably between the two radiation detecting elements that perform coincidence.

Effect of the Invention

In this invention, the number of coincidence events is obtained while the phantom that emits annihilation radiation pairs moves as to pass through the inner hole of the detector ring. Such configuration dose not need the phantom having a width equal or larger than the detector ring, and may realize reliable collection of calibration data. Moreover, it may be considered that annihilation radiation pairs have been emitted in uniform property without depending on positions of the detector ring. As a result, calibration data may be obtained that is more suitable for removal of the image artifact.

Moreover, with this configuration, data processing on the number of coincidence events may significantly be reduced. Specifically, the coincidence device counts the number of coincidence events only when a distance between two radiation detecting elements in the extension direction is equal or less than a given length. Moreover, in order to emit annihilation radiation pairs reliably between the two radiation detecting elements that perform coincidence, the phantom has a length in the extension direction that is longer than the given length.

DESCRIPTION OF REFERENCES

9 . . . radiation tomography apparatus
12 . . . detector ring

12b . . . unit detector ring
15 . . . bed moving mechanism (phantom moving device)
16 . . . bed movement controller (phantom movement control device)
21 . . . coincidence section (coincidence device)
26 . . . calibration data generation section (calibration data generation device)
41 . . . phantom

BEST MODE FOR CARRYING OUT THE INVENTION

Description will be given hereinafter of the best mode of a method of collecting calibration data in radiation tomography apparatus according to this invention with reference to the drawings. Gamma rays to be described hereinafter are an example of radiation in this invention.

Embodiment 1

<Whole Configuration of Radiation Tomography Apparatus>

Figure 1:
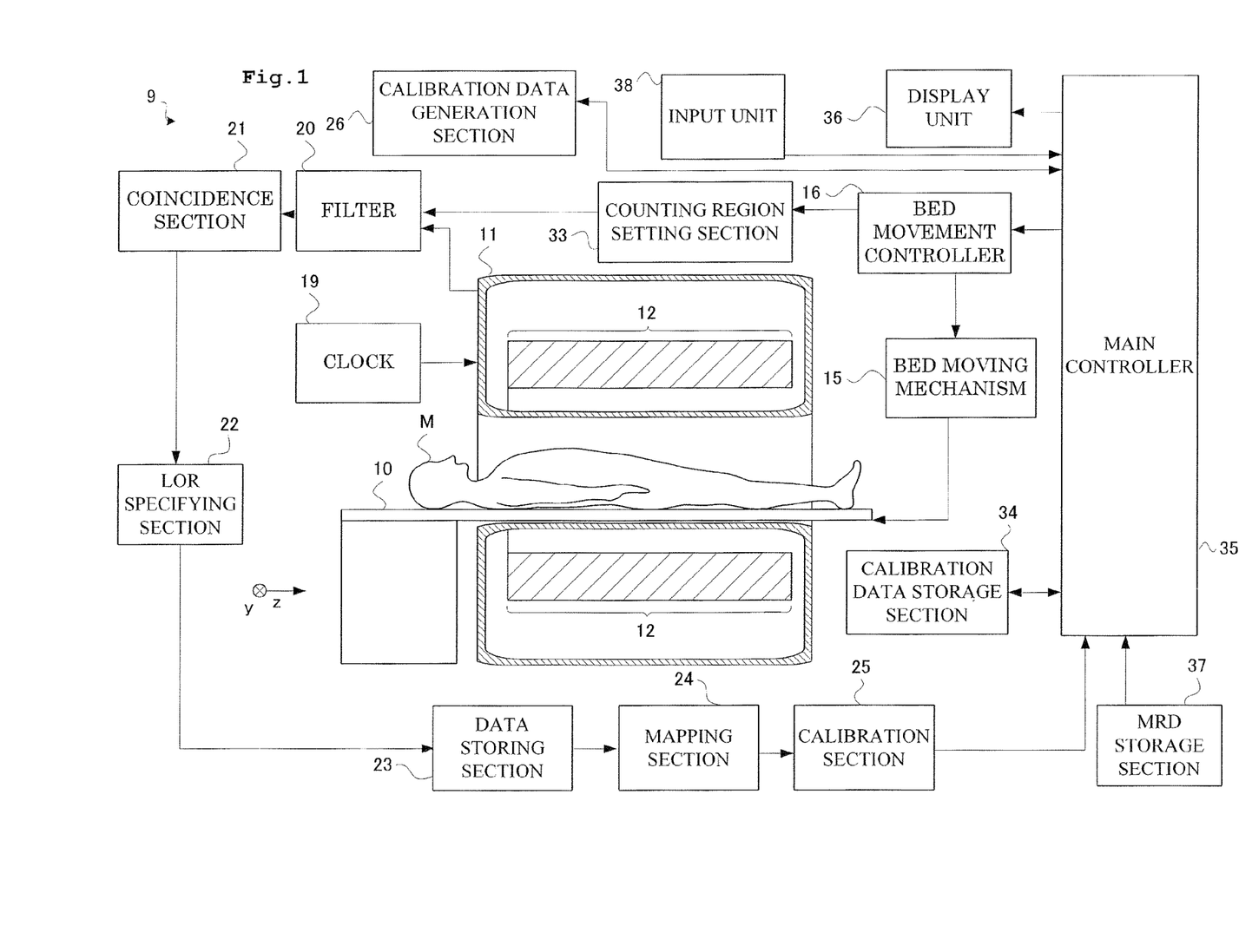
FIG. 1 is a functional block diagram showing a configuration of the radiation tomography apparatus according to Embodiment 1.

Each embodiment of radiation tomography apparatus according to this invention will be described hereinafter with reference to the drawings. FIG. 1 is a functional block diagram showing a configuration of the radiation tomography apparatus according to Embodiment 1. As shown in FIG. 1, the radiation tomography apparatus according to Embodiment 1 includes a bed 10 for placing a subject M on the back thereof, and a gantry 11 with a through hole for surrounding the subject M. The bed 10 is provided as to pass through an opening of the gantry 11. The bed 10 freely moves in and out along a direction where the opening of the gantry 11 extends. A bed moving mechanism 15 slides the bed 10 as above. A bed movement controller 16 controls the bed moving mechanism 15.

The gantry 11 includes a detector ring 12 inside thereof that detects annihilation gamma-ray pairs from the subject M. The detector ring 12 is tubular and extends in a body axis direction z of the subject M (corresponding to the extension direction of this invention.) The detector ring 12 has a length of 1 m to 1.8 m. That is, the detector ring 12 extends as to completely cover at least a body portion of the subject M. A clock 19 sends out time information to the detector ring 12. Time information about when gamma rays were obtained is given to detection data outputted from the detector ring 12, and inputted into a filter 20 mentioned later.

Figure 2:
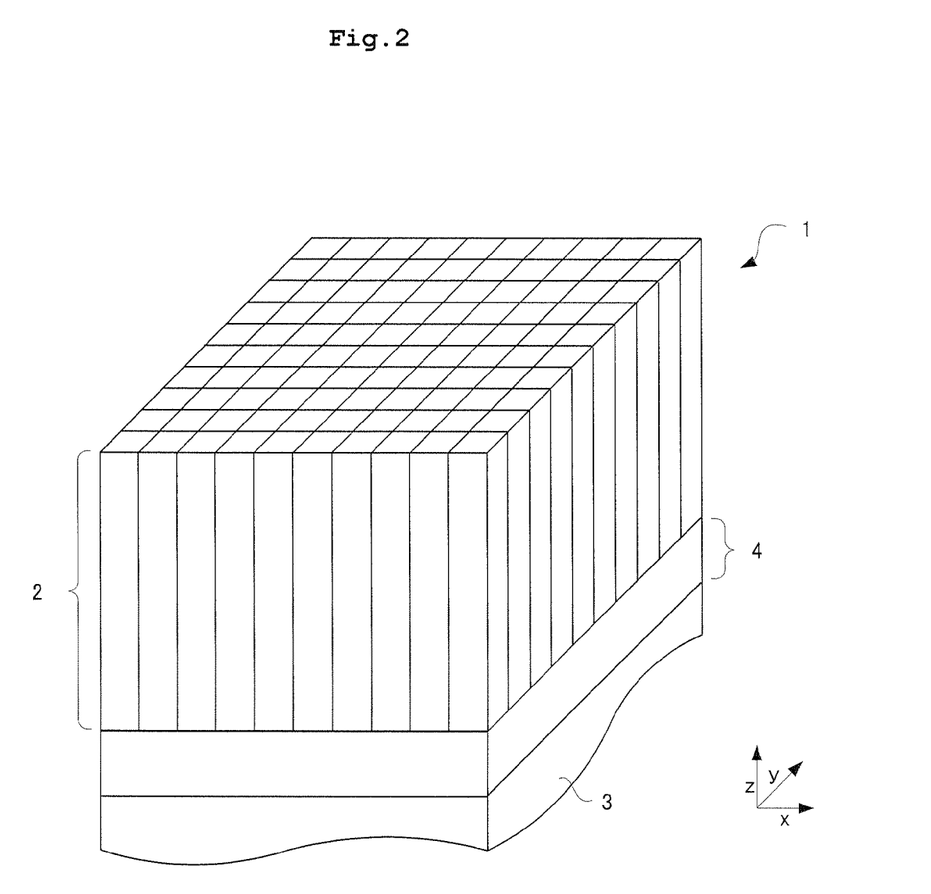
FIG. 2 is a perspective view showing a configuration of a radiation detector according to Embodiment 1.

The detector ring 12 has block radiation detectors 1 arranged in a ring shape. It is assumed that a width per one radiation detector 1 is approximately 5 cm. Approximately twenty to thirty-six radiation detectors 1 are to be arranged in the detector ring in the z-direction. Next, simple description will be given of a construction of the radiation detector 1. FIG. 2 is a perspective view showing a configuration of the radiation detector according to Embodiment 1. As shown in FIG. 2, the radiation detector 1 includes a scintillator 2 that converts radiation into fluorescence, and a light detector 3 that detects fluorescence. A light guide 4 is provided between the scintillator 2 and the light detector 3 for receiving fluorescence.

The scintillator 2 has two or more scintillation counter crystals arranged in a two-dimensional array. Each of the scintillation counter crystals is composed of $Lu_{2(1-x)}Y_{2x}SiO_5$ (hereinafter referred to as LYSO.) The light detector 3 allows determination about which scintillation counter crystal emits fluorescence as well as of intensity of fluorescence and time when fluorescence is generated. Here, the scintillator 2 having the configuration of Embodiment 1 is only exemplification of an aspect that may be adopted. Consequently, the configuration of this invention is not limited to this.

Figure 3:
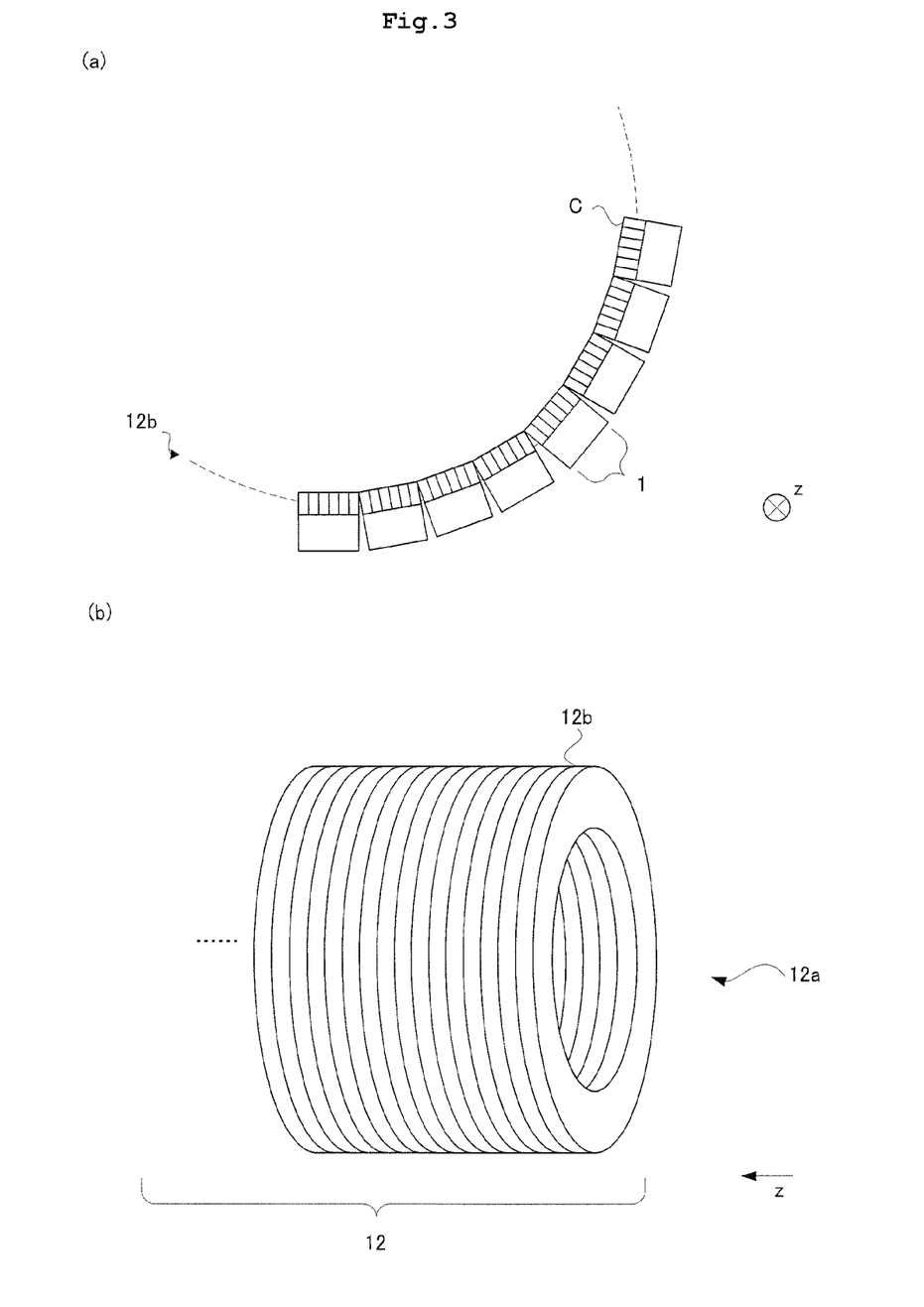
FIG. 3 is a view showing a configuration of a detector ring according to Embodiment 1.

Description will be given of a configuration of the detector ring 12. FIG. 3 is a view showing a configuration of the detector ring 12 according to Embodiment 1. The radiation detectors 1 are arranged along an imaginary circle (exactly equilateral n-sided polygon) in the detector ring 12. Accordingly, the scintillation counter crystals are also arranged along an imaginary circle (exactly equilateral n-sided polygon) to form a unit detector ring 12b as shown in FIG. 3(a). The unit detector rings 12b are located in the same position with respect to the z-direction. The unit detector ring 12b is formed of scintillation counter crystals C (radiation detecting elements) arranged along a circular ring. That is, the unit detector ring 12b has the scintillation counter crystals arranged in one row, which is based on an independent concept from the radiation detector 1 arranged along the imaginary circle. Then, as shown in FIG. 3(b), the unit detector rings 12b are connected to one another in the z-direction to form the detector ring 12. The unit detector ring 12b has a through hole at a center thereof. It may be considered that the unit detector rings 12b are arranged such that the through holes thereof are connected to one another to form the detector ring 12.

According to Embodiment 1, the detector ring 12 is formed in a circular ring shape by arranging around 100 radiation detectors 1. Consequently, the through hole 12a is of 100-sided polygon, for instance, seen thereof from the z-direction. In this case, two or more unit detector rings 12b are connected as to share each central axis thereof. The through hole 12a has a shape of a 100-sided prism.

The radiation tomography apparatus 9 according to Embodiment 1 further includes each section for obtaining sectional images of the subject M, as shown in FIG. 1. Specifically, the radiation tomography apparatus 9 includes a filter 20 for extracting effective data from detection data detected in the detector ring 12; a coincidence section 21 that receives the data determined as the effective data in the filter 20 and performs coincidence of an annihilation gamma-ray pair; an LOR specifying section 22 for specifying an incident position of gamma rays in the detector ring 12 based on two pieces of gamma-ray detection data determined to be an annihilation gamma-ray pair in the coincidence section 21; a data storage section 23 for storing the detection data; a mapping section 24 for generating a sectional image of the subject M; and a calibration section 25 for performing calibration to the sectional image of the subject M. The calibration section 25 removes a image artifact falling in the sectional image with reference to an original map stored in a calibration data storage section 34. Here, the reason for provision of a counting region setting section 33 will be mentioned later. In addition, an MRD storage section 37 stores MRD, mentioned later. An input unit 38 inputs operator's operations. For instance, the input unit 38 receives change of the MRD, for instance.

The coincidence section corresponds to the coincidence device in this invention. The calibration data generation section corresponds to the calibration data generation device in this invention. Moreover, the bed moving mechanism corresponds to the phantom moving device in this invention. The bed movement controller corresponds to the phantom movement control device.

The radiation tomography apparatus 9 according to Embodiment 1 further includes a main controller 35 for controlling each section en bloc, and a display unit 36 for displaying a radiological image. The main controller 35 is formed of a CPU, and performs execution of various programs to realize the filter 20, the coincidence section 21, the LOR specifying section 22, the data storage section 23, the mapping section 24, and the calibration section 25. The above sections may each be divided into a controller that performs their functions.

<Obtainment of Original Map>

Next, description will be given of a method of obtaining an original map stored in the calibration data storage section 34. The original map is mapping data containing mapped variation in detection sensitivity of the annihilation radiation pairs that the detector ring 12 uniquely has. In order to generate the original map, firstly a phantom 41 is prepared that emits radiation. The phantom 41 has an enough width to be placed on the bed 10, and is cylindrical that extends in the z-direction. The phantom 41 has a length in the z-direction that is characteristic of this embodiment, which is to be mentioned later.

The phantom 41 is cylindrical that conforms to the shape of the opening of the gantry 11, and has a hollow portion filled with a solution. The phantom 41 has a movement direction relative to the detector ring 12 that is the same direction as the extension direction thereof. Firstly, the hollow portion of the phantom 41 is filled with the solution, and then a radioactive material is added thereinto. As for types of radioactive materials, a nuclide that emits positrons to generate annihilation gamma-ray pairs is selected. More particularly, the nuclide is preferably the same as that used for radiopharmaceutical injected into the subject M. The radiopharmaceutical is added into the phantom 41 filled with the solution, and the hollow portion of the phantom 41 is enclosed. Thereafter, the phantom 41 is shaken. In so doing, annihilation gamma-ray pairs are to be emitted uniformly from the entire of the phantom 41.

Figure 4:
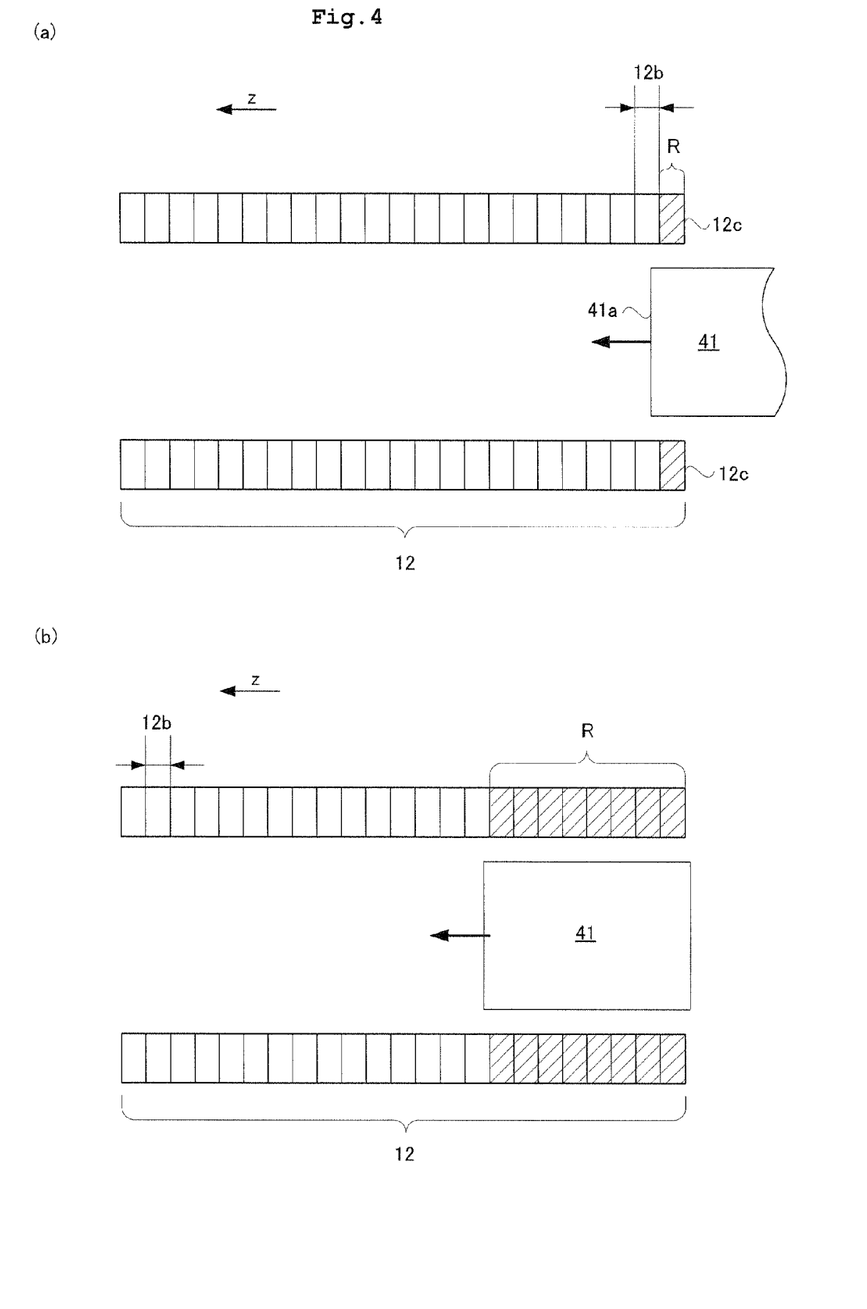
FIGS. 4 and 5 are sectional views each showing a method of obtaining an original map according to Embodiment 1.

Subsequently, the phantom 41 is attached to the bed 10. Here, gamma rays are attenuated due to the bed 10 when the phantom 41 is placed on the bed 10. Consequently, a collection system is preferable in which gamma rays emitted from the phantom directly reach the detector using a phantom attachment jig, etc. Moreover, the phantom 41 has a length in the z-direction that is shorter than the detector ring 12. The bed moving mechanism 15 slides the bed 10 having the phantom 41 carried thereon. Accordingly, as shown in FIG. 4(*a*), a front end 41*a* of the phantom 41 passes the unit detection ring 12*c* at one end of the detector ring 12. This point in time is an initial position of the phantom 41.

The radiation tomography apparatus 9 collects calibration data under a state where the phantom 41 is in the initial position mentioned above. The detection data obtained in the detector ring 12 (data on fluorescence emitted from the scintillation counter crystals) is sent to the filter 20. The filter 20 passes only detection data in a counting region R obtained in the scintillation counter crystals into the coincidence section 21, and disposes of the other detection data. In so doing, needless calculation may be omitted in the coincidence section 21, which leads to significant simplification of the complicated coincidence calculation. The counting region R in the initial position contains only scintillation counter crystals belonging to the unit detector ring 12*c*. Specifically, it is shown as a slash region in FIG. 4(*a*).

The counting region setting section 33 sets the counting region R. The filter 20 successively reads out a newest counting region R from the counting region setting section 33.

Where detection data derived from two different scintillation counter crystals is putted in a time window having a given temporal width in the coincidence section 21, the data is assumed to be from the annihilation gamma-ray pairs. The frequency of this is counted, which corresponds to the number of coincidence events. Here, temporal information that the clock 19 gives to the detection data is used for determination of coincident property.

The LOR specifying section 22 specifies a direction where the annihilation gamma-ray pairs are emitted. That is, the detection data considered coincident by the coincidence section 21 also contains positional information which scintillation counter crystal emits fluorescence. The LOR specifying section 22 specifies an LOR (Line of Response) as a line connecting the two scintillation counter crystals, and sends out the LOR and the number of coincidence events corresponding thereto to the data storage section 23.

The bed 10 slides while radiation is detected as above. Accordingly, a relative position of the phantom 41 and the detector ring 12 is changed from the initial position, and the counting region R is changed. Specifically, when the phantom 41 moves by a width of the unit detector ring 12*b* in the z-direction from the initial position, a region of the unit detector ring 12*b* adjacent to the unit detector ring 12*c* is added to the counting region R. In other words, data indicating a moving state of the bed 10 is sent from the bed movement controller 16 to the counting region setting section 33. The counting region setting section 33 expands the counting region R in accordance with the data.

Subsequently, the counting region setting section 33 newly adds a single unit detector ring 12*b* every time the phantom 41 moves by a width of the unit detection ring 12*b* for expanding the counting region R in the z-direction until the phantom 41 is in a state of FIG. 4(*b*) where the detector ring 12 entirely covers with the phantom 41. In other words, the scintillation counter crystal facing the phantom 41 lies in the counting region R. In FIG. 4(*b*), the counting region R has a width of eight scintillation counter crystals. The number eight is obtained by adding the number one to the MRD, mentioned later.

Figure 5:
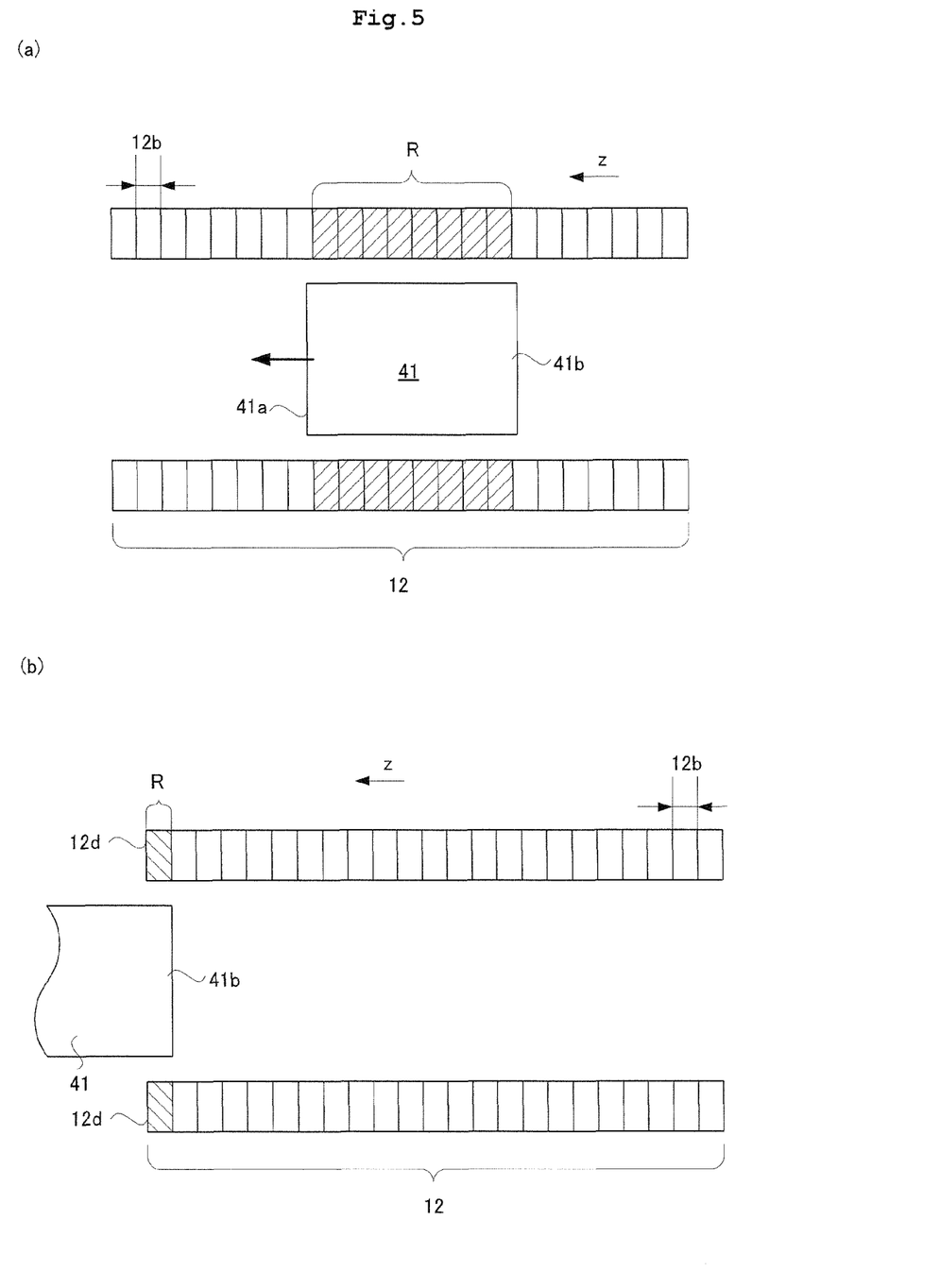

The phantom 41 moves by a width of the unit detector ring 12*b* from the state of FIG. 4(*b*), and the counting region setting section 33 does not expand the counting region R any more, but shifts the counting region R as to follow the phantom 41. That is, the counting region setting section 33 removes the unit detector ring 12*c* from the counting region R, and resets the counting region R as to newly add a single detector ring 12*b* located in a front end 41*a* side of the phantom 41. The counting region setting section 33 shifts the counting region R every time the phantom 41 moves by a width of the unit detector ring 12*b*. FIG. 5(*a*) shows the phantom 41 located in the middle of the detector ring 12. The counting region R always lies in a section between the front end 41*a* and the rear end 41*b* of the phantom 41 in the z-direction.

Subsequently, as the phantom 41 moves, the unit detection ring 12*b* to be located behind the rear end 41*b* is to be removed from the counting region R one after another. Finally, as illustrated in FIG. 5(*b*), the rear end 41*b* of phantom 41 is located in unit detection ring 12*d* which lies at one end of detector ring 12. This state corresponds to the termination movement position of the phantom 41.

In so doing, the scintillation counter crystals of the detector ring 12 always lie in the counting region R during movement of the phantom 41 from the initial position to the termination position. Accordingly, coincidence is performed to every scintillation counter crystal.

The data storage section 23 stores the LOR and the number of coincidence events corresponding thereto. The mapping section 24 constructs the data to obtain an original map in which an interior of the detector ring 12 is visible. The phantom 41 emits annihilation radiation pairs uniformly. Accordingly, it may be simply estimated that no image artifact appears in the original map. In actual fact, however, it is not always the case. Some image artifact appears in the original map under the influence of variation in sensitivity among each scintillation counter crystal.

The followings, other than the above variation in sensitivity, may cause the image artifact. For instance, in the radiation detector 1, the scintillation counter crystal located on the side of the scintillator 2 has a property that is difficult in detecting radiation rather than that located in the middle of the scintillator, which causes the image artifact. The factor causing such image artifact is referred to as a transaxial block profile factor. On the other hand, the longer and the narrower the LOR is, the less detection sensitivity of gamma rays becomes, which property leads to another image artifact. The factor leading to such image artifact is referred to as a radial geometric factor.

Moreover, the factors other than the foregoing factors include a crystal interference factor. Where gamma-rays obliquely enter into the scintillation counter crystals, or gamma-rays enter into the DOI detector with information in the depth direction, gamma-rays are not occasionally detected but pass through the scintillation counter crystals adjacent to the phantom 41, and are detected in crystals close to the crystals, i.e., apart from the phantom 41. In this case, the scintillation counter crystal apart from the phantom 41 has detection sensitivity lower than that close to the phantom 41, which causes the image artifact. This is a crystal interference factor. The original map also has the image artifact appearing therein that is derived from these factors.

Calibration data is generated in the calibration data generation section 26 based on the original map, and is stored in the calibration data storage section 34. When the calibration data is applied to the original map, the image artifact of the original map is canceled.

<Operation of Radiation Tomography Apparatus>

Next, description will be given of operations of radiation tomography apparatus 9 according to Embodiment 1. Upon conducting of examinations with the radiation tomography apparatus 9 according to Embodiment 1, firstly the subject M with radiopharmaceutical administered thereto by injection in advance is laid on the bed 10. Then, the bed 10 slides to move the subject M into the opening of the gantry 11. From here, the annihilation gamma-ray pair emitted from the subject M is detected.

Figure 6:
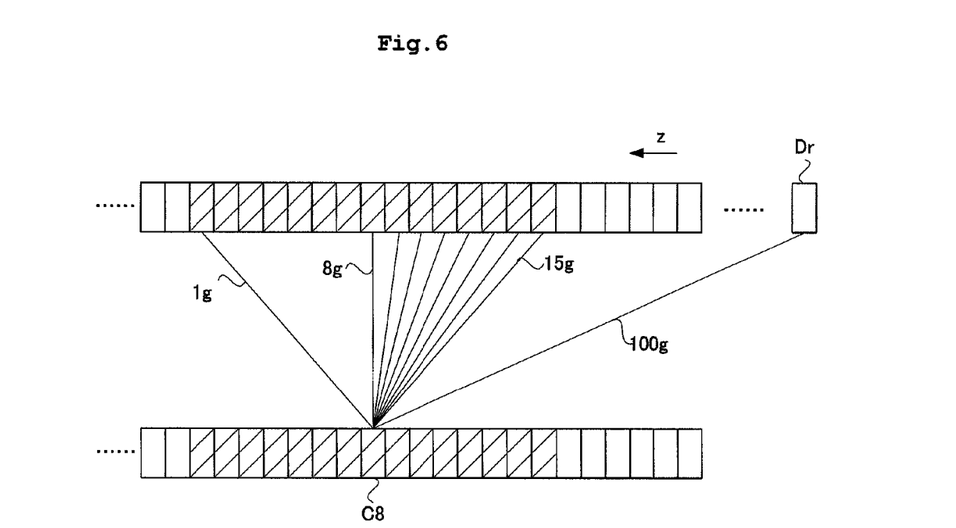
FIGS. 6 to 8 are sectional views each showing a method of obtaining a sectional image according to Embodiment 1.

Description will be given of a maximum ring difference (MRD) as an important concept in detecting the annihilation radiation pair. The LOR originally means a line connecting two different scintillation counter crystals. As shown in FIG. 6, giving attention to a scintillation counter crystal C8, numerous LORs may be considered. However, all the LORs are not needed for obtaining the sectional image. For instance, the LOR 100g connects the scintillation counter crystal C8 and the scintillation counter crystal Dr. Both scintillation counter crystals are far apart from each other in the z-direction, and thus gamma-rays obliquely enter into the scintillation counter crystals. Such gamma rays are difficult to be detected. Performance of coincidence in the LOR 100g does not contribute to clarifying the sectional image. Simultaneously, calculation of coincidence should be simple. In terms of suppression in number of LORs, an idea may be drawn that there is no need for counting the LOR 100g from the beginning.

That is, when considered the LOR of the scintillation counter crystal C8, only the scintillation counter crystals adjacent to the scintillation counter crystal C8 in the z-direction are needed for consideration. For instance, considered is the LOR of the scintillation counter crystal C8 having a distance in the z-direction of not more than seven scintillation counter crystals. The number seven is a number of scintillation counter crystals for controlling the number of LORs to be in consideration in performing coincidence. This is referred to as MRD (Maximum ring difference.) Specifically, it is assumed that MRD is seven. The LORs to be in consideration are LOR 1g to LOR 15g. More generally, the LORs for scintillation counter crystal C8 are only the LORs connecting any of scintillation counter crystals in a region having a width of fifteen scintillation counter crystals (i.e., of MRD×2+one MRD) and the scintillation counter crystal C8.

Such selection of LORs is performed with the filter 20. Where two scintillation counter crystals coincidentally detect gamma-rays, the filter 20 passes detection data of the two scintillation counter crystals into the coincidence section 21 when the two scintillation counter crystals have a clearance therebetween in the z-direction of the MRD or less, and disposes of the detection data when the clearance is larger than the MRD.

The filter 20 sends detection data to the coincidence section 21, the LOR specifying section 22, the data storage section 23, and the mapping section 24. Operations of these are the same as the above, and thus description thereof will be omitted. The sectional image of the subject M constructed in the mapping section 24 is outputted into the calibration section 25. In the calibration section 25, data processing is performed for removing the image artifact superimposed on the sectional image of the subject M based on the calibration data stored in the calibration data storage section 34. The display unit 36 displays a completion image obtained in this way. As noted above, an inspection with the radiation tomography apparatus 9 according to Embodiment 1 is to be completed.

<Regarding Length of Phantom>

Next, description will be given of a length of the phantom 41 distinctive in Embodiment 1. As described with FIG. 5(a), the length of the phantom 41 is closely associated with the maximum length of the counting region R. Accordingly, in Embodiment 1, determination of the suitable maximum length of the counting region R naturally leads to determination of the length of the phantom 41.

The filter 20 selects the LOR to be used for coincidence counting upon inspection of the subject M. Moreover, the LOR is selected through specifying the counting region R upon obtaining the calibration data. Thus, the calibration data may be obtained most effectively by corresponding selection of the LOR upon inspection of the subject M to that upon obtaining the calibration data.

Figure 7:
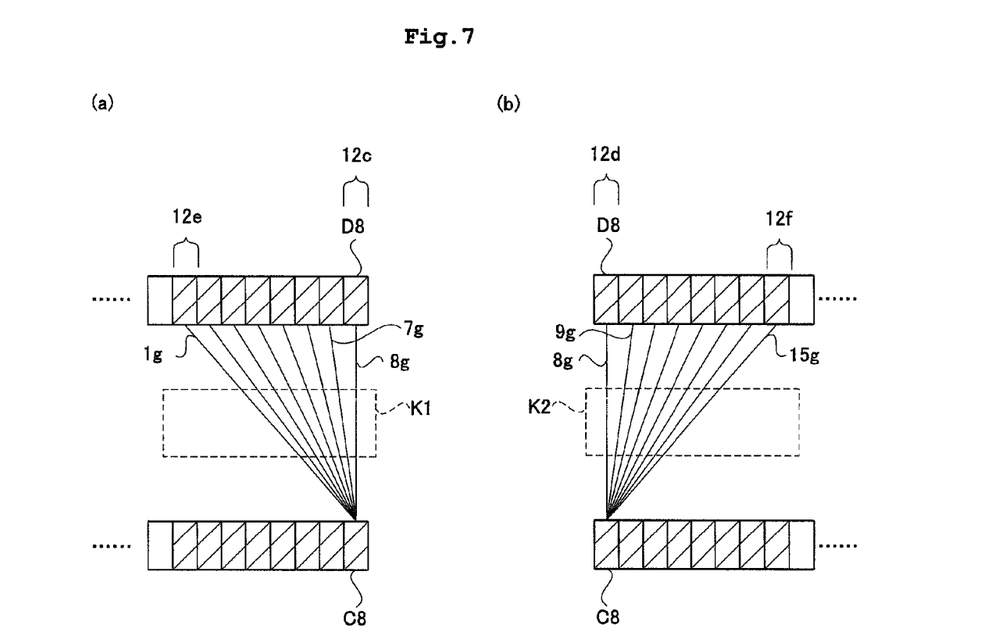

Description will be given of setting the length of the phantom 41 regarding the state of the art noted above. Firstly, the unit detector ring 12c at one end of the detector ring 12 is to be considered. FIG. 7 is a schematic view showing the LOR in the unit detector ring at one end of the detector ring according to Embodiment 1. Here, let the unit detector ring apart by seven unit detector rings from the unit detector ring 12c be a detector ring 12e. As is apparent from FIG. 7(a), the LOR among the LORs of scintillation counter crystal C8 in the unit detector ring 12c that is used for inspection has eight types of LORs, i.e., seven types of LORs 1g to 7g each connecting the scintillation counter crystals C8 to the scintillation counter crystal apart by one to seven unit detector rings, respectively, from the unit detector ring 12c, and one type of LOR 8g connecting the scintillation counter crystal C8 to the scintillation counter crystal D8 in the unit detector ring 12c.

Here, a region K1 in FIG. 7(a) is a region occupied by the phantom 41 at one time when calibration data is obtained. The phantom 41 has a length equal or more than eight times the width of the unit detector ring. Accordingly, every LOR 1g to LOR 8g will pass the region K1. Assuming that the phantom 41 lies in the region K1, the annihilation gamma-ray pairs are reliably emitted from the phantom 41 along the LOR 1g to LOR 8g. The length of eight times the width of the unit detector ring (a width of MRD+one unit detector ring 12b) corresponds to the given length of this invention.

Secondary, the unit detector ring 12d at the other end of the detector ring 12 is to be considered. Here, let the unit detector ring apart by seven unit detector rings from the unit detector ring 12d be a detector ring 12f. As is apparent from FIG. 7(*b*), the LOR among the LORs of scintillation counter crystal C8 in the unit detector ring 12d that is used for inspection has eight types of LORs, i.e., seven LORs 9g to 15g each connecting the scintillation counter crystal C8 to the scintillation counter crystal apart by one to seven unit detector rings, respectively, from the unit detector ring 12d, and one LOR 8g connecting the scintillation counter crystal C8 to the scintillation counter crystal D8 in the unit detector ring 12d.

Here, a region K2 in FIG. 7(*b*) is a region occupied by the phantom 41 at one time when calibration data is obtained. The phantom 41 has a length equal or more than eight times the width of the unit detector ring. Accordingly, every LOR 8g to LOR 15g will pass the region K2. Assuming that the phantom 41 lies in the region K2, the annihilation-gamma-ray pairs are reliably emitted from the phantom 41 along the LOR 8g to LOR 15g.

Figure 8:
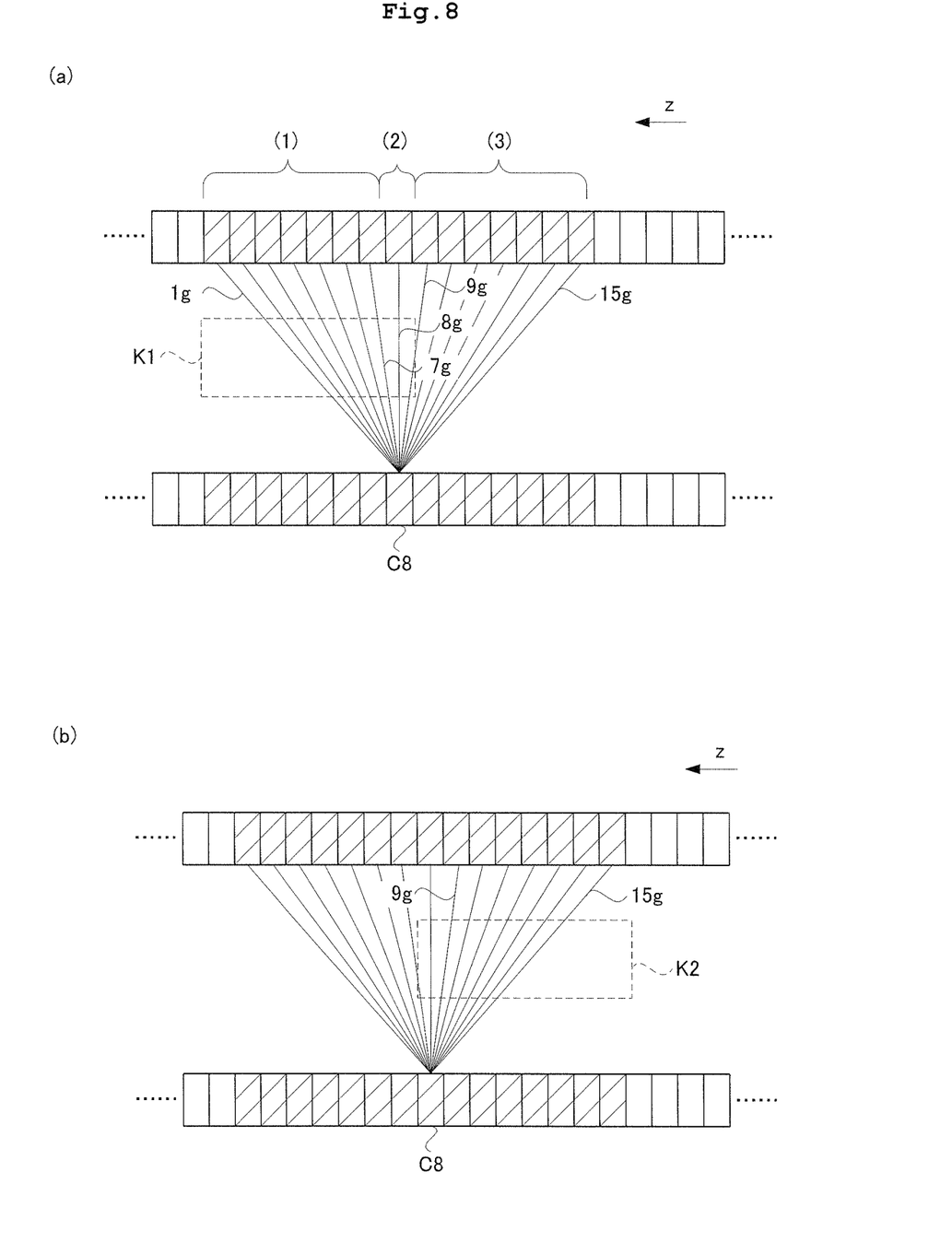

Next, description will be given of the scintillation counter crystals located in the middle of the detector ring 12. This case is seen from a conceptual view with a combination of FIG. 7(*a*) and FIG. 7(*b*). FIG. 8 is a conceptual view showing the LOR in the unit detector ring located in the middle of the detector ring according to Embodiment 1. As is seen from FIG. 8(*a*), the LOR among the LORs of the scintillation counter crystal C8 used for inspection has fifteen types of LORs, i.e., (1) seven types of LORs 1g to 7g each connecting the scintillation counter crystal C8 to the to the unit detector ring located on the left side thereof (at the other end of the detector ring 12) apart by one to seven unit detector rings, respectively, from the scintillation counter crystal C8, (2) one type of LOR 8g connecting the scintillation counter crystal C8 to the unit detector ring belonging thereto, and (3) seven types of LORs 9g to 15g each connecting the scintillation counter crystal C8 to the unit detector ring located on the right side thereof (at one end of the detector ring 12) and apart by one to seven unit detector rings, respectively, from the scintillation counter crystal C8. A region K1 in FIG. 8(*a*) is a region occupied by the phantom 41 at one time when calibration data is obtained. That is, as for eight types of LOR 1g to LOR 8g described in the above (1) and (2), the annihilation gamma-ray pairs are reliably emitted from the phantom 41 along these LORs.

Moreover, a region K2 in FIG. 8(*b*) is a region occupied by the phantom 41 at one time when calibration data is obtained. That is, as for seven types of LOR 9g to LOR 15g described in the above (3), the annihilation gamma-ray pairs are reliably emitted from the phantom 41 along these LORs.

Where the scintillation counter crystal C8 is located adjacent to the detector rings 12c and 12d in FIG. 7, some of the LORs 1g to 15g are not able to be drawn. This case may be described using FIG. 8. That is, where the scintillation counter crystal C8 is located adjacent to the right end of the detector ring 12, it is only necessary to delete some of the detector rings located on the right side of the scintillation counter crystal C8 in FIG. 8(*a*). Where the scintillation counter crystal C8 is located adjacent to the left end of the detector ring 12, it is only necessary to delete some of the detector rings located on the left side of the scintillation counter crystal C8 in FIG. 8(*b*). As above, even when the scintillation counter crystal C8 is located adjacent to one end of the detector ring 12, the annihilation gamma-ray pairs are always emitted reliably from the phantom 41 along the LORs for use in inspection.

As above, in any cases, calibration data for every LOR used in inspection is obtained, which leads to reliable removal of the image artifact superimposed on the detection data obtained during the inspection.

As noted above, Embodiment 1 has a configuration in which the number of coincidence events are obtained while the phantom 41 that emits annihilation radiation pairs moves as to pass through the inner hole of the detector ring 12. Such configuration dose not need the phantom 41 having a width equal or larger than that of the detector ring 12, and may realize reliable collection of calibration data. Moreover, the phantom 41 presents a shape that emits annihilation gamma-ray pairs uniformly to the detector ring 12. However, actual annihilation gamma-ray pairs may somewhat differ in irradiation property when the radiation source inside the phantom 41 has poor uniformity. In the conventional configuration in which the phantom 41 does not move in the detector ring 12, annihilation radiation pairs to be emitted differ in irradiation property depending on positions of the detector ring 12. Accordingly, variation in irradiation of annihilation radiation pairs in the phantom 41 will be superimposed on the calibration data. On the other hand, according to Embodiment 1, the phantom 41 moves into the detector ring 12. Consequently, variation in irradiation of the phantom 41 with annihilation radiation pairs becomes blurred in the calibration data. Moreover, it may be considered that annihilation radiation pairs have been emitted in uniform property without depending on positions of the detector ring 12. As a result, calibration data more suitable for removal of the image artifact may be obtained. Here, in any cases where the inner hole of the detector ring 12 is shorter or longer than the phantom 41, movement of the phantom 41 relative to the detector ring 12 may always remove variation in radiation of the phantom 41 with annihilation radiation pairs.

Moreover, with this configuration, data processing on the number of coincidence events may significantly be reduced. Specifically, the coincidence section 21 counts the number of coincidence events only when a distance between two scintillation counter crystals in the z-direction is equal or less than a given length (the maximum length of the counting region R.) Where two scintillation counter crystals are far apart from each other in the z-direction, the number of coincidence events is not counted between such scintillation counter crystals. That is because a burden of the coincidence section 21 increases. Moreover, the phantom 41 has a length in the z-direction that is longer than the given length. In other words, the annihilation gamma-ray pair may be emitted reliably between the two scintillation counter crystals that perform coincidence.

This invention is not limited to the foregoing configurations, but may be modified as follows.

Figure 9:
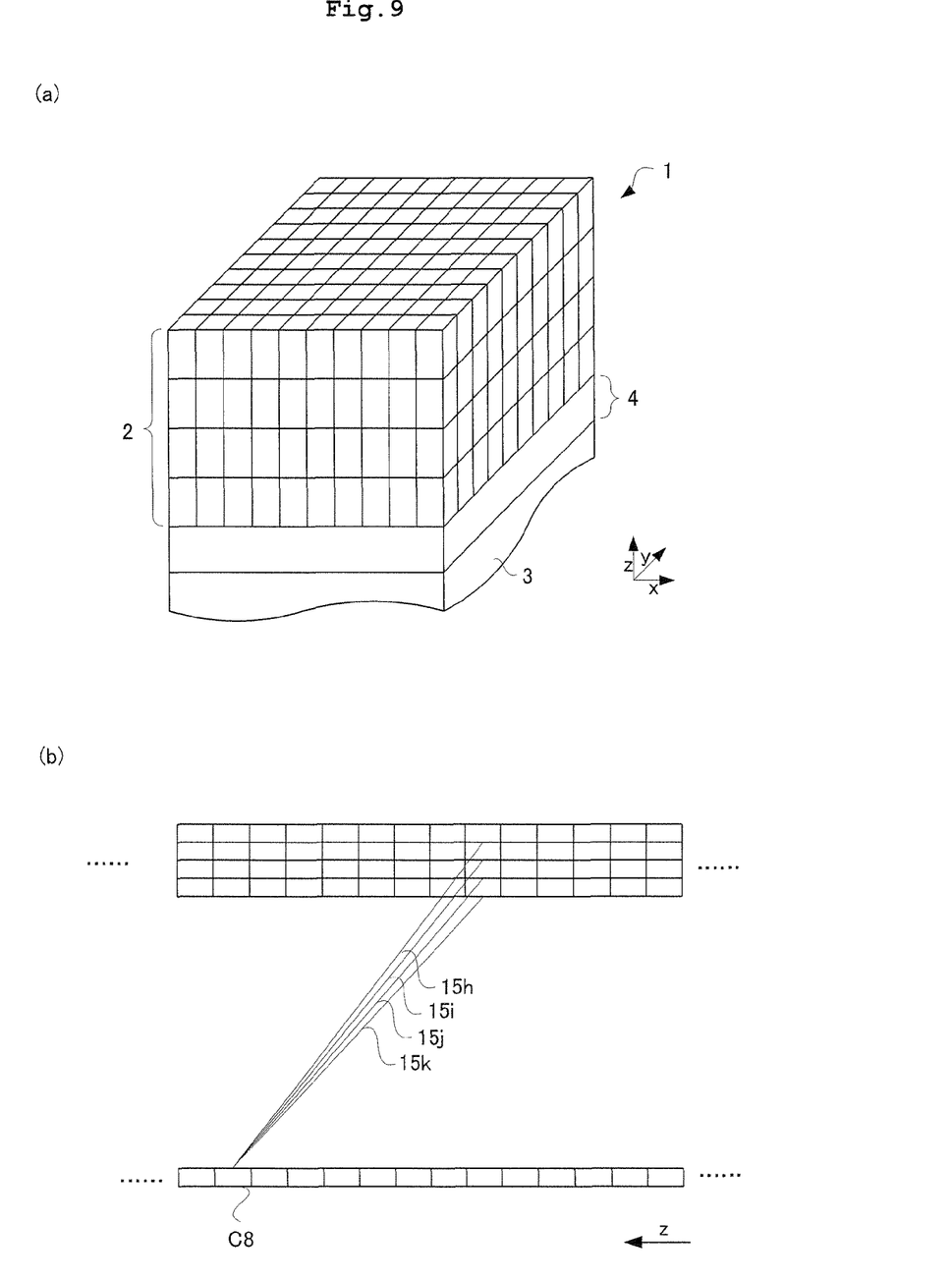
FIG. 9 is a plan view showing a configuration according to one modification of this invention.

(1) In each of the foregoing embodiments, the radiation detector 1 has a single scintillation counter crystal layer. This invention is not limited to this embodiment. That is, as shown in FIG. 9(*a*), the radiation detector 1 of multiple crystal layers may be adopted. Such configuration may enhance detection sensitivity and a discriminative capability of the incident position of gamma rays in the radiation detector 1. According to the embodiment of FIG. 9(*a*), four crystal layers having scintillation counter crystals arranged two-dimensionally are laminated on a light guide 4. The number of layers is not limited to this. A great majority of description in Embodiment 1 may be used for operations of obtaining the original map and generating the sectional image of the subject M in this modification. A specific variation is that the LOR increases rather than that in Embodiment 1. For instance, regarding the LOR of the scintillation counter crystal C8 in FIG. 9(b), the LOR corresponds to the LOR 15g in FIG. 8(a) is divided into four types of LORs, i.e., (1) the LOR 15h connecting the scintillation counter crystal C8 and an uppermost crystal layer, (2) the LOR 15i connecting the scintillation counter crystal C8 and a second crystal layer, (3) the LOR 15j connecting the scintillation counter crystal C8 and a third crystal layer, and (4) the LOR 15k connecting the scintillation counter crystal C8 and a fourth crystal layer. The filter 20 passes detection data to each subsequent section without discriminating the four layers. The LOR specifying section 22 performs data processing through discriminating the four layers.

(2) In the foregoing embodiment, the phantom 41 only moves in one direction. This invention is not limited to this configuration. That is, the phantom 41 may once move from the state of FIG. 4(a) to that of FIG. 5(b), and thereafter move back to the state of FIG. 4(a). In other words, the original map may be generated while the phantom 41 reciprocates inside the detector ring 12. The effect concerning this modification is as follows. The phantom 41 is shaken prior to use to irradiate the detector ring 12 with the annihilation gamma-ray pairs uniformly. However, actual annihilation gamma-ray pairs differ in irradiation property depending on positions of the phantom 41. In the conventional configuration in which the phantom 41 does not move into the detector ring 12, annihilation gamma-ray pairs to be emitted differ in irradiation property depending on positions of the detector ring 12. Accordingly, variation in irradiation of annihilation gamma-ray pairs in the phantom 41 will be superimposed on the calibration data. According to this modification, the phantom 41 moves into the detector ring 12. Consequently, variation in irradiation of annihilation gamma-ray pairs in the phantom 41 becomes blurred in the calibration data. Moreover, it may be considered that annihilation gamma-ray pairs have been emitted in uniform property without depending on positions of the detector ring. As a result, calibration data more suitable for removal of the image artifact may be obtained.

(3) Moreover, in the foregoing embodiment, reference has not been made in particular to the speed of the phantom 41. In obtaining the original map, the speed of the foregoing phantom 41 may be the fastest at the time the phantom 41 starts moving, and that the speed gradually slows as the phantom 41 moves. According to this configuration, it may be considered that annihilation gamma-ray pairs have been emitted in the detector ring 12 in uniform property. The annihilation gamma-ray pair contained in the phantom 41 is strongest when the phantom 41 is set into the detector ring 12, and is attenuated gradually due to physical halftime. Consequently, the dose of annihilation gamma-ray pairs per unit time to be emitted in the detector ring 12 differs between the movement starting position and the movement termination position of the phantom 41. With this configuration, control of the speed of the phantom 41 may realize decrease in dose of annihilation gamma-ray pairs to be emitted in the detector ring 12 in the movement starting position of the phantom 41, whereas the control may realize increase in dose of annihilation gamma-ray pairs to be emitted in the detector ring 12 in the movement termination position of the phantom 41.

(4) In each of the foregoing embodiments, the scintillation counter crystal is composed of LYSO. Alternatively, the scintillation counter crystal may be composed of another materials, such as GSO ($Gd_2SiO_5$), may be used in this invention. According to this modification, a method of manufacturing a radiation detector may be provide that allows provision of a radiation detector of low price.

(5) The fluorescence detector in each of the foregoing embodiments is formed of the photomultiplier tube. This invention is not limited to this embodiment. A photodiode, an avalanche photodiode, a semiconductor detector, etc., may be used instead of the photomultiplier tube.

(6) In the foregoing embodiment, the bed is freely slidable. This invention is not limited to this. For instance, the bed may be fixed, whereas the gantry 11 may slide.

INDUSTRIAL UTILITY

As described above, this invention is suitable for radiation tomography apparatus for medical uses.

The invention claimed is:

1. A method of collecting calibration data in radiation tomography apparatus having unit detecting rings with radiation detecting elements arranged annularly for detecting radiation, a coincidence device for counting a number of coincidence events as a number of times that two different radiation detecting elements detect radiation coincidentally, and a calibration data generation device for generating calibration data based on the number of coincidence events, and further having a detector ring with the unit detector rings laminated such that central axes thereof conform to one another, wherein the number of coincidence events is obtained while a phantom emitting annihilation radiation pairs moves within an inner hole of the detector ring;

wherein a direction where the detector ring extends is an extension direction, the phantom moves relative to the detector ring along the extension direction, and the phantom has a length in the extension direction that is shorter than detector ring in the extension direction.

2. The method of collecting calibration data in radiation tomography apparatus according to claim 1, wherein the phantom is moved with a phantom moving device that moves the phantom and a phantom control device that controls the phantom moving device.

3. The method of collecting calibration data in radiation tomography apparatus according to claim 1, wherein, the phantom reciprocates relative to the detector ring.

4. The method of collecting calibration data in radiation tomography apparatus according to claim 1, wherein the phantom has a speed that is the fastest at the time of starting movement, and gradually slows as the phantom moves.

5. The method of collecting calibration data in radiation tomography apparatus according to claim 1, wherein the coincidence device counts the number of coincidence events only when a distance between two radiation detecting elements in the extension direction is equal or less than a given length, and the phantom has a length in the extension direction that is longer than the given length.

6. The method of collecting calibration data in radiation tomography apparatus according to claim 2, wherein the phantom reciprocates relative to the detector ring.

7. The method of collecting calibration data in radiation tomography apparatus according to claim 2, wherein the phantom has a speed that is the fastest at the time of starting movement, and gradually slows as the phantom moves.

8. The method of collecting calibration data in radiation tomography apparatus according to claim 3, wherein the phantom has a speed that is the fastest at the time of starting movement, and gradually slows as the phantom moves.

9. The method of collecting calibration data in radiation tomography apparatus according to claim 2, wherein
the coincidence device counts the number of coincidence events only when a distance between two radiation detecting elements in the extension direction is equal or less than a given length, and
the phantom has a length in the extension direction that is longer than the given length.

10. The method of collecting calibration data in radiation tomography apparatus according to claim 3, wherein
the coincidence device counts the number of coincidence events only when a distance between two radiation detecting, elements in the extension direction is equal or less than a given length, and
the phantom has a length in the extension direction that is longer than the given length.

11. The method of collecting calibration data in radiation tomography apparatus according to claim 4, wherein
the coincidence device counts the number of coincidence events only when a distance between two radiation detecting elements in the extension direction is equal or less than a given length, and
the phantom has a length in the extension direction that is longer than the given length.

\* \* \* \* \*